United States Patent
Sato

(10) Patent No.: US 7,813,610 B2
(45) Date of Patent: Oct. 12, 2010

(54) PLASTIC OPTICAL MEDIUM AND PRODUCTION METHOD THEREOF

(75) Inventor: Masataka Sato, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 101 days.

(21) Appl. No.: 11/921,326

(22) PCT Filed: Jun. 6, 2006

(86) PCT No.: PCT/JP2006/311690

§ 371 (c)(1),
(2), (4) Date: Nov. 30, 2007

(87) PCT Pub. No.: WO2006/132395

PCT Pub. Date: Dec. 14, 2006

(65) Prior Publication Data

US 2009/0129736 A1    May 21, 2009

(30) Foreign Application Priority Data

Jun. 8, 2005    (JP) ............................. 2005-167864

(51) Int. Cl.
G02B 6/02    (2006.01)
(52) U.S. Cl. ..................................... 385/126; 264/1.24
(58) Field of Classification Search ......... 385/123–128; 264/1.24

See application file for complete search history.

(56) References Cited

U.S. PATENT DOCUMENTS

| 4,610,506 A * | 9/1986 | Tokunaga et al. ............ 385/128 |
| 5,639,512 A * | 6/1997 | Nonaka et al. ............ 427/163.2 |
| 6,768,851 B2 * | 7/2004 | Chiang et al. ................ 385/124 |
| 7,711,227 B2 * | 5/2010 | Chiang et al. ................ 385/124 |
| 2001/0026875 A1 * | 10/2001 | Hwang et al. ............. 428/542.8 |
| 2001/0036349 A1 * | 11/2001 | Abe et al. .................... 385/124 |

FOREIGN PATENT DOCUMENTS

| EP | 1 494 072 A2 | 1/2005 |
| JP | 60-119509 | * 6/1985 |
| JP | 62-250324 A | 10/1987 |
| JP | 1-265208 A | 10/1989 |
| JP | 10-96825 A | 4/1998 |
| JP | 10-111414 A | 4/1998 |
| JP | 10-133036 A | 5/1998 |
| JP | 11-52146 A | 2/1999 |
| JP | 2001-215345 A | 8/2001 |
| JP | 2001-350052 A | 12/2001 |
| JP | 2004-212723 A | 7/2004 |

* cited by examiner

Primary Examiner—Charlie Peng
(74) Attorney, Agent, or Firm—Sughrue Mion, PLLC

(57) ABSTRACT

A first polymerizable composition is poured into a pipe (30), then is polymerized to be a first layer (13). Next, a second polymerizable composition is poured into the pipe (30) and polymerized to be a second layer (14). These pouring and polymerizing processes are repeated to form an optical medium (10) including n-layers of polymer. Each layer is formed by polymerizing the polymerizable composition comprising same kinds of plural polymerizable contents as those in other polymerizable compositions for other layers. The layer at the inner side is formed from the polymerizable composition including larger ratio of a polymerizable content which has higher refractive index than that of at least another polymerizable content in the same polymerizable composition, compared with the polymerizable composition for forming the adjacent layer at the outer side. A difference of refractive indices between adjacent two polymer layers is at least $5 \times 10^{-5}$ but less than $5 \times 10^{-3}$.

6 Claims, 9 Drawing Sheets

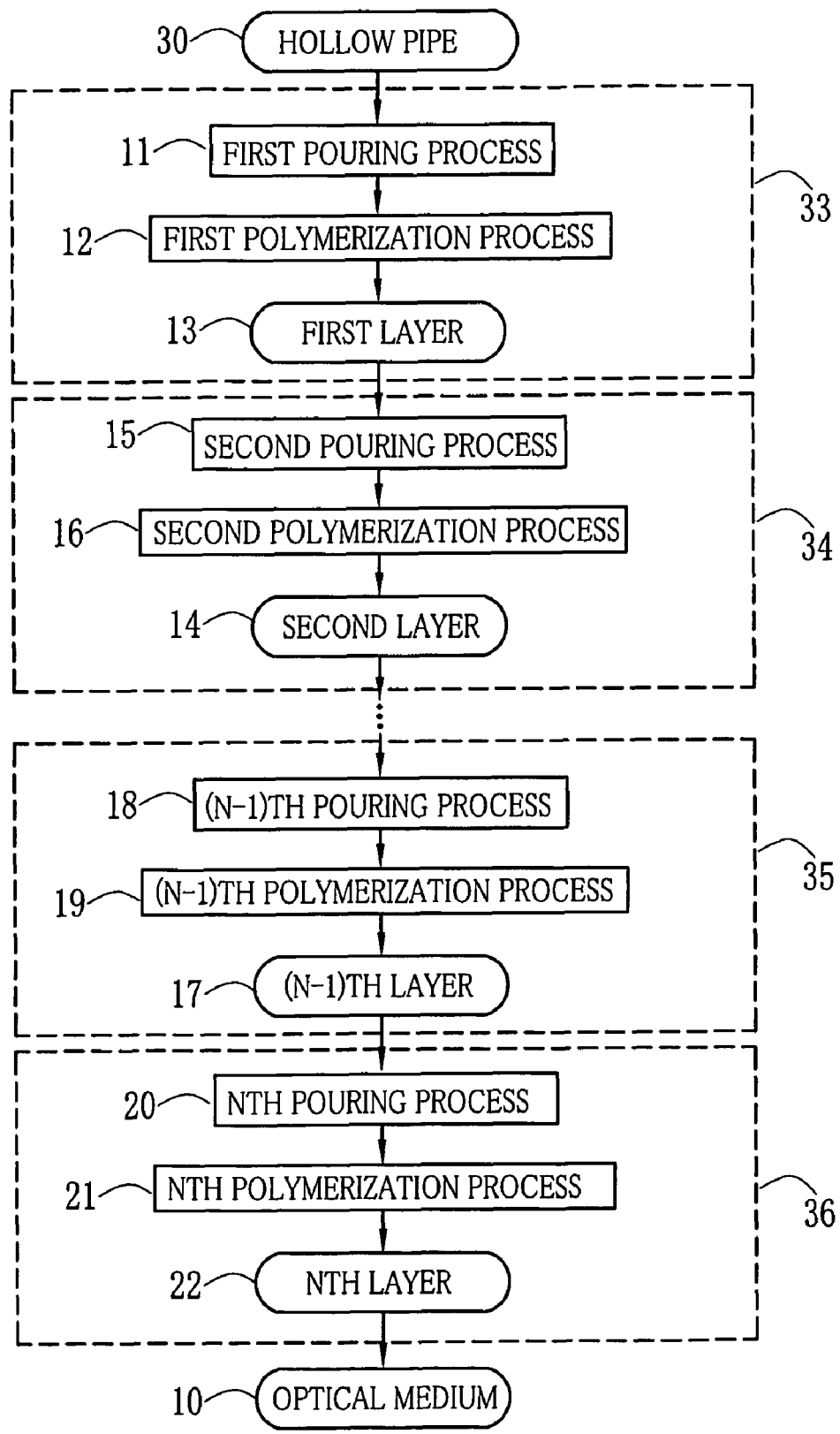

PLASTIC OPTICAL MEDIUM AND PRODUCTION METHOD THEREOF

TECHNICAL FIELD

The present invention relates to a plastic optical medium and a production method thereof, especially a plastic optical medium and a production method thereof preferably utilized for optical waveguide, such as an optical fiber, or a lens.

BACKGROUND ART

As an optical medium, glass (optical glass) used to be used. The optical glass is chemically stable and has properties such as superior transparency, formability and hardness. Therefore, it is used to optical waveguide such as an optical fiber, lenses, and electronic parts and so on. However, recently plastic materials become an attractive option to form the optical medium. The optical plastic material utilizes a phenomenon in which light entering into polymer passes through the polymer while repeating reflection at the surface of the polymer. The optical plastic material has high transparency, and superior lightweight and workability than those of the optical glass. The optical plastic material is applied to various techniques. For example, there is a plastic optical fiber (POF) used as the optical fiber.

The POF is formed from polymers each of which has refractive index different to each other. Light entering to one end of the POF passes through the POF while repeating total reflection at the interface between layers having different refractive indices. Recently, a graded-index POF, in which the refractive index varies in radial direction thereof, has gotten a lot of attention. In the graded-index POF, light through the center and light entering the periphery are transmitted in approximately same time by its specific refractive index distribution. Therefore, distortion does not occur in an input signal, which realizes large capacity of transmission and high-speed communication.

As a production method for the graded-index POF, there is a method in which a preform of the POF is formed and then heat-drawn to be the POF having a desired diameter. To apply the desired refractive index distribution to the preform, there is a method in which refractive index controlling agent is added in main content to be a light transmission section of the POF. By controlling the amount of the adding refractive index controlling agent according to the position in the radial direction, the refractive index can vary in the radial direction of the preform. For example, Japanese Patent Laid-Open Publication No. 2001-215345 discloses a method in which a monomer material is poured into a rotating tube and polymerized to be an outer shell, then the monomer material including the refractive index controlling agent is continuously poured into the tube while gradually increasing the adding amount of the refractive index controlling agent so as to form the light transmission section by polymerization.

However, it is difficult to make desired refractive index distribution with high accuracy by adding the refractive index controlling agent. In considering this problem, there is a method in which the light transmission section including a plurality of layers are formed by pouring polymerizable composition to be a layer on another layer containing residual (unreacted) polymerizable composition (for example, see Japanese Patent Laid-Open Publication No. 10-096825).

In Japanese Patent Laid-Open Publication No. 10-096825, some combination of the residual polymerizable composition in the layer and the other polymerizable composition poured on the layer possibly generates polymer blend which causes loss of the transparency of the light transmission section. In addition, when the difference between refractive indices of the adjacent two layers is not appropriately adjusted, the light entering into the light transmission section possibly reflected at an interface between the layers therein. Therefore, there is a need to find a production method for the POF having superior transparency and transmission band available to resent high-speed communication network, without above-described problems.

An object of the present invention is to provide an optical medium, which can be used for lenses or optical fibers including graded-index POF, and a production method of this optical medium.

DISCLOSURE OF INVENTION

In order to achieve the above objects and other objects, in a production method for a plastic optical medium of the present invention, at first, a polymerizable composition is poured in a hollow portion of a pipe, and the polymerizable composition is polymerized while rotating the pipe to form a first polymer layer on an inner wall of the pipe. Then a pair of the pouring step and the polymerizing step is additionally performed n−1 times (n is an integer at least two) to stack n-layers including the first polymer layer to a nth polymer layer in a concentric fashion. A difference of refractive indices between adjacent two polymer layers is at least $5 \times 10^{-5}$ but less than $5 \times 10^{-3}$.

It is preferable that first to nth polymerizable compositions to generate the first to nth polymer layers include mixture of same plural polymerizable contents. In this case, a mixing ratio of the polymerizable contents is changed according to each of the first to nth polymerizable compositions to give a different refractive index to each of the first to nth polymer layers. When the polymer layer at the inner side is designed to have a higher refractive index than that of the adjacent polymer layer at the outer side in the radial direction, the polymer layer at the inner side is formed from the polymerizable composition including larger ratio of the polymerizable content which has a higher refractive index than that of at least another polymerizable content in the same polymerizable composition, compared with the polymerizable composition for forming the adjacent polymer layer at the outer side in the radial direction.

The present invention includes a plastic optical medium produced by the above production method. It is preferable that the plastic optical medium is an optical fiber or a graded-index lens. In addition, the plastic optical medium of the present invention has a cross-section in which there is a plurality of polymer layers in a concentric fashion, the polymer layer at the inner side having a refractive index higher than that of the adjacent polymer layer at the outer side in the radial direction, a difference of the refractive indices between the adjacent two polymer layers being at least $5 \times 10^{-5}$ but less than $5 \times 10^{-3}$.

When the present invention is applied to the optical fiber, a graded-index POF having superior transparency and transmission band can be obtained. In addition, the present invention can be applied to plastic optical waveguides and plastic lenses. Especially, when the present invention is applied to the lens, the lens can have superior focusing property.

BRIEF DESCRIPTION OF DRAWINGS

FIG. 1 is a process chart of an optical medium of the present invention;

BEST MODE FOR CARRYING OUT THE INVENTION

Figure 2A:
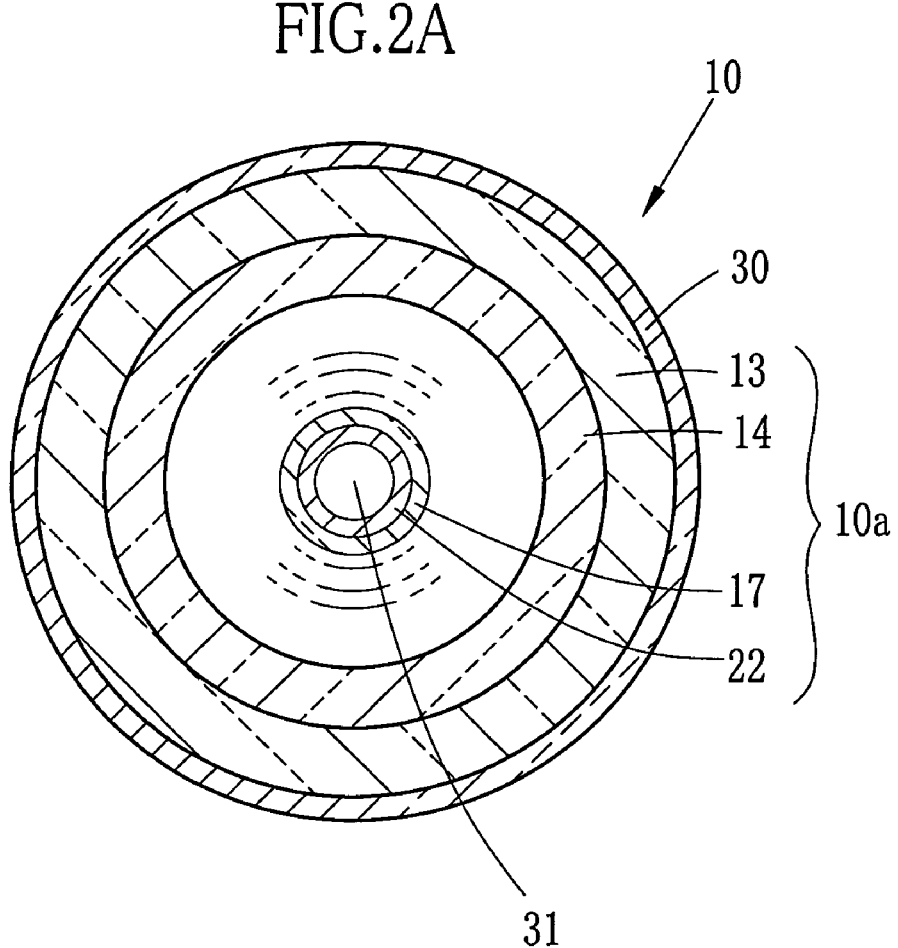
FIG. 2A is a cross-sectional view of the optical medium.

The preferable embodiments of the present invention are hereinafter described, but these embodiments do not limit the present invention. Manufacture processes for an optical medium are roughly described with reference to FIG. 1.

An optical medium 10 of the present invention has a light transmission section 10a of n-layered structure (n is an integer at least 2) including a first layer 13 and a second layer 14 to a (n−1)th layer 17 and a nth layer 22. Each layer forming process includes a pouring process in which polymerizable composition for the layer is poured and a polymerization process for polymerizing the polymerizable composition to synthesize polymer. In this embodiment, polymerizable composition for each layer is poured into a pipe 30.

In a first layer forming process 33, a first polymerizable composition for the first layer 13 is poured into the pipe 30 as a first pouring process 11. Then the first polymerizable composition is polymerized to be the first layer 13, as the first polymerization process 12. Next, in a second layer forming process 34, a second polymerizable composition is poured on the first layer 13 in the pipe 30 as a second pouring process 15, and the second polymerizable composition is polymerized to be the second layer 14 inside the first layer 13 as a second polymerization process 16. Such layer forming process is continuously repeated until a desired number of layers are formed. To form the (n−1)th layer 17 which is just outside the innermost layer (the nth layer 22),in the same way as the first and second layers, a (n−1)th polymerizable composition is poured as a (n−1)th pouring process 18 and the (n−1)th polymerizable composition is polymerized as a (n−1)th polymerization process 19, in a (n−1)th layer forming process 35. Finally, a nth polymerizable composition is poured on the (n−1)th layer 17 in the pipe 30 as a nth pouring process 20, and the nth polymerizable composition is polymerized to be the nth layer 22 as a nth polymerization process 21, in a nth layer forming process 35. Accordingly, the optical medium 10 including n-number of concentric layers is formed. The multilayered structure including the plural layers can reduce loss in optical transmission. Note that in each polymerization process, a rotation polymerization method in which the pipe containing the polymerizable composition is rotated to polymerize the polymerizable composition. This method is described in detail later.

As shown in FIG. 2A, in the optical medium 10, each layer has tubular shape, whose outer diameter, inner diameter and thickness are uniform throughout its longitudinal direction. In addition, there is hollow portion 31 in center of the radial direction. Although FIG. 2A clearly shows a border between each adjacent two layers, the border may be identified not clearly, because the clarity of the border is dependent on conditions of the production. In addition, the hollow portion 31 may be not formed and the optical medium 10 may have a solid cylindrical shape in other production conditions.

Figure 2B:
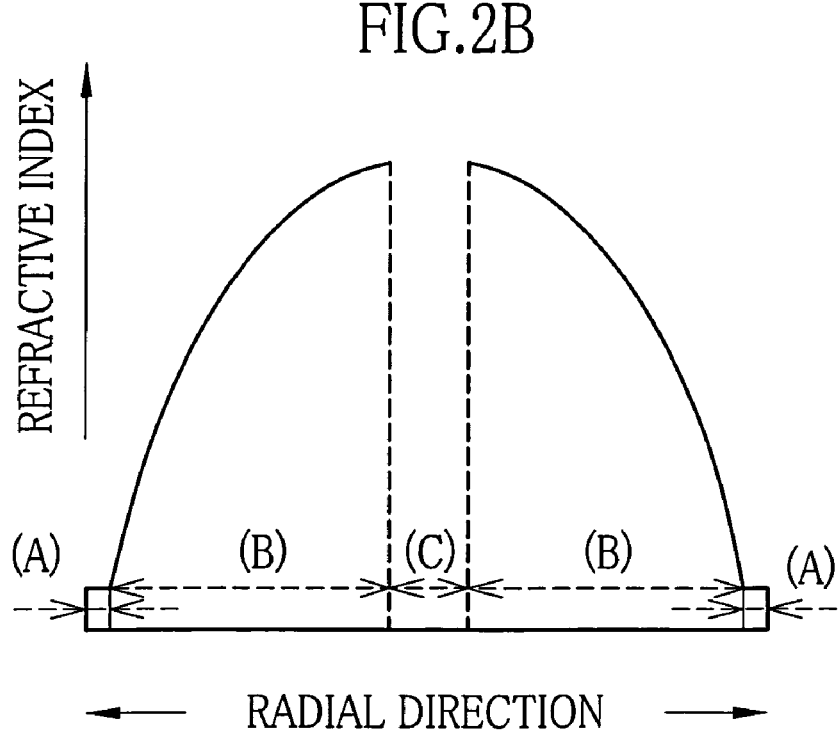
FIG. 2B is an explanatory view describing a refractive index distribution of the optical medium in radial direction.
Figure 3:
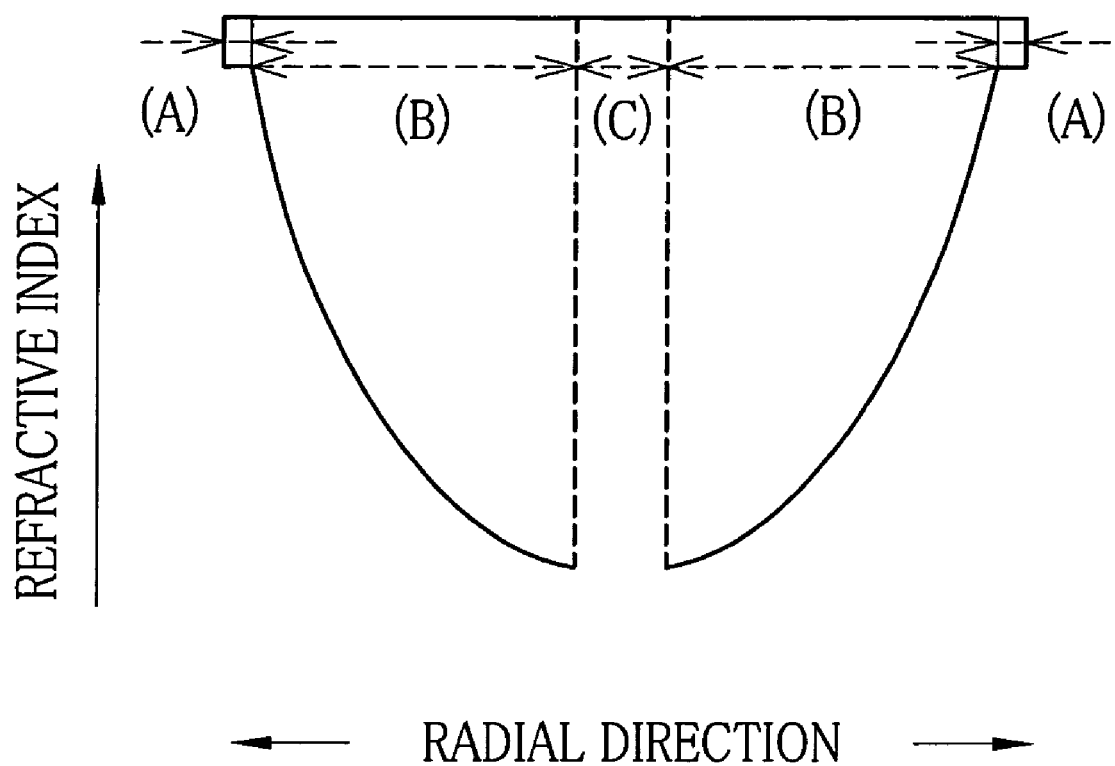
FIG. 3 is an explanatory view describing a refractive index distribution of another optical medium in radial direction.

In FIG. 2B, the refractive index profile is illustrated. The refractive index increases as the line in the graph goes upward. The range (A) corresponds to the pipe 30, the range (B) corresponds to the first to nth layers, and the range (C) corresponds the hollow portion 31. As shown in FIG. 2B, the optical medium 10 has the refractive index gradually decreasing toward the outside of the radial direction. However, the refractive index may gradually increases toward the outside of the radial direction as shown in FIG. 3. In FIG. 3, the correspondences of the ranges (A) to (c) are as same as FIG. 2B.

The difference between the refractive indices of any adjacent two layers in the light transmission section 10a, is at least $5 \times 10^{-5}$ but less than $5 \times 10^{-3}$. Since the difference between the refractive indices of the adjacent two layers is adjusted as described above, conformity of the interfaces is improved. Accordingly, white turbidity or the like does not cause and the transparency is improved. In addition, superior transmission band property can be obtained. When the layers are arranged such that the layer at the inner side has a higher refractive index than that of the adjacent layer at the outer side, the optical medium 10 has a refractive index distribution in which the refractive index gradually decreases toward the outside in the radial direction. However, as stated above, the layer at the inner side may have a lower refractive index than that of the adjacent layer at the outer side. In this case, the optical medium 10 has a refractive index distribution in which the refractive index gradually decreases toward the center in the radial direction. Such optical medium can have a function as concave lens or the like. Note that the refractive index throughout the first to nth layers may change in a stepwise manner or a continuous manner.

When pouring amount of the polymerizable composition into the pipe 30 becomes smaller for forming the inner layer than for forming the outer layer, each layer can be adjusted to have a thickness same or close to other layers. Note that the pouring amount of the polymerizable composition is not limited.

A method for giving the refractive index distribution to the optical medium 10 will be explained. Each layer in the light transmission section 10a is formed by polymerizing the polymerizable composition comprising same kinds of plural polymerizable contents as those in other polymerizable compositions for other layers. In detail, at least two kinds of polymerizable contents having different refractive indices are used, and these polymerizable contents are copolymerized to be a copolymer at a different compounding ratio for each layer. It is preferable that two kinds of polymerizable contents having different refractive indices are used for each layer in terms of affinity of layers and handling ability in manufacturing. However, three or more kinds of polymerizable contents may be used in considering optical and/or mechanical property of the final product, or productivity. In this case, each polymerizable composition for each layer may have different kinds of contents and different compounding ratio from other polymerizable compositions. As described above, since polymerizable contents having different refractive indices are copolymerized at different compounding ratio, each of plural layers can have different refractive index. In addition, since each layer is formed from the polymerizable composition including same polymerizable contents as those in other polymerizable compositions for other layers, affinities of interfaces of layers can be improved.

The layer at the inner side is formed from the polymerizable composition including larger ratio of a polymerizable content which has higher refractive index than that of at least another polymerizable content in the same polymerizable composition, compared with the polymerizable composition for forming the adjacent layer at the outer side. Accordingly, the layer at the inner side has higher refractive index than that of the layer at the outer side in the radial direction, and the optical medium 10 in which the refractive index increases toward the center in the radial direction can be obtained. Instead of that, the layer at the inner side maybe formed from the polymerizable composition including larger ratio of polymerizable content which has lower refractive index than that of at least another polymerizable content in the same polymerizable composition, compared with the polymerizable composition for forming the adjacent layer at the outer side. In this case, the layer at the inner side has lower refractive index than that of the layer at the outer side in the radial direction, and the optical medium 10 in which the refractive index decreases toward the center in the radial direction can be obtained. Such optical medium has the function as concave lens.

Such optical medium 10 has superior transparency in spite of being formed from polymer. Since the multi-layer structure including a plurality of layers having different refractive indices gives high refractive index to the optical medium 10, it can be preferably used as optical lenses such as a rod lens. In addition, improved conformity of the interfaces gives superior transmission band property to the optical medium 10, it can be preferably used as the optical fiber, especially as a graded-index POF. Note that in this embodiment the optical medium 10 includes the outer shell so that the total number of layers is (n+1), however, the pipe 30 (outer shell) may be removed to form the optical medium having n-layer structure after forming the light transmission section 10a.

As an example of utilization of the optical medium and production method thereof of the present invention, a formation of a preform for a POF will be described.

Figure 4:
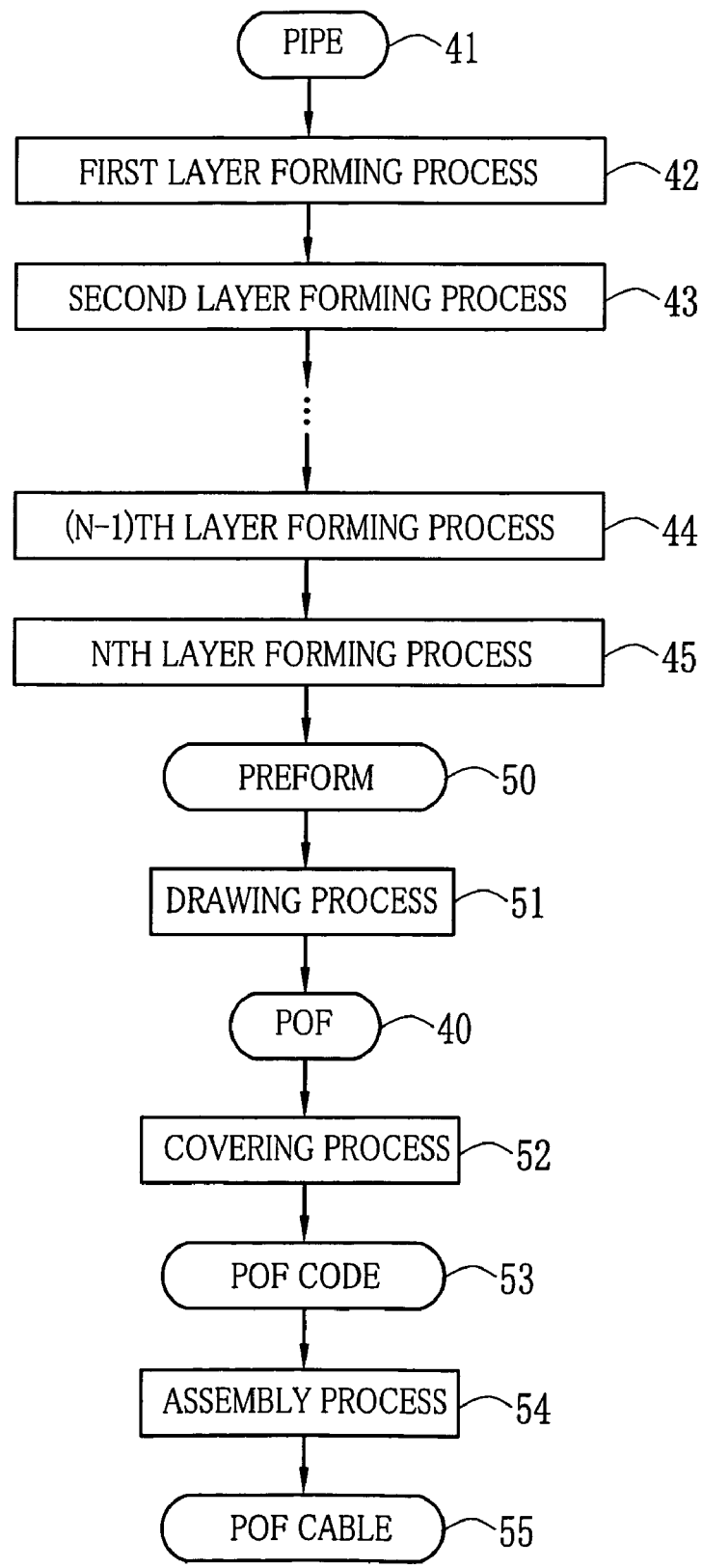
FIG. 4 is a process chart of a plastic optical fiber of the present invention.

As shown in FIG. 4, the manufacturing process of the POF 40 includes the first layer forming process 42, the second layer forming process 43, the (n−1)th layer forming process 44 and the nth layer forming process 45 to form multi-layered structure on the inner wall of the pipe 41. Then a preform 50 formed by the above process is heat-drawn to be the POF 40 at the drawing process 51.

The first layer is formed on the inner wall of the pipe 41 formed by a commercial type melt-extrusion machine or the like. The pipe 41 becomes a outer shell of the POF 40. In the first layer forming process 42, the first polymerizable composition is poured into the hollow portion of the pipe 41. Next, the first polymerizable composition is polymerized to be the first layer. Then the second polymerizable composition, which is prepared to have higher refractive index than that of the first polymerizable composition, is poured inside the first layer and is polymerized to be the second layer. After that, pouring and polymerizing the polymerizable composition are continuously repeated, and finally the (n−1)th layer and the nth layer are sequentially formed. Accordingly, the preform 50, which has a core of concentric n-layered structure formed inside the pipe 41, is formed. Note that pouring amount of the polymerizable composition into the pipe 41 becomes smaller for forming the inner layer than for forming the outer layer.

The preform 50 is drawn in the drawing process 51 to be the POF 40 having desired diameter. In the drawing process 51, the cylindrical preform 50 is heated and drawn in its longitudinal direction. Note that the preform 50 itself exhibits the function as the light transmission medium, before being drawn to be the POF 40.

In the covering process 52, the outer peripheral surface of the POF 40 is covered by covering material. In this process, it is general that the second covering is applied on the first covering on the POF 40. However, the number of covering layers is not limited in one or two. The POF 40 with applied the covering layer is called the POF code 53.

In the assembly process 54, the single or plural POF codes 53 are processed to be the POF cable 55. In this specification, the single POF code 53 on which further covering is applied according to need is called as the single fiber cable. In contrary, a plurality of the POF codes 53 which is assembled with tension member and/or the like and covered by covering member is called as the multi fiber cable. Note that the expression "POF cable 55" includes both of the single fiber cable and the multi fiber cable.

Next, with reference to FIG. 5, the preform 50 obtained from the present invention will be explained in detail. However, the present invention is not limited in this embodiment.

Figure 5:
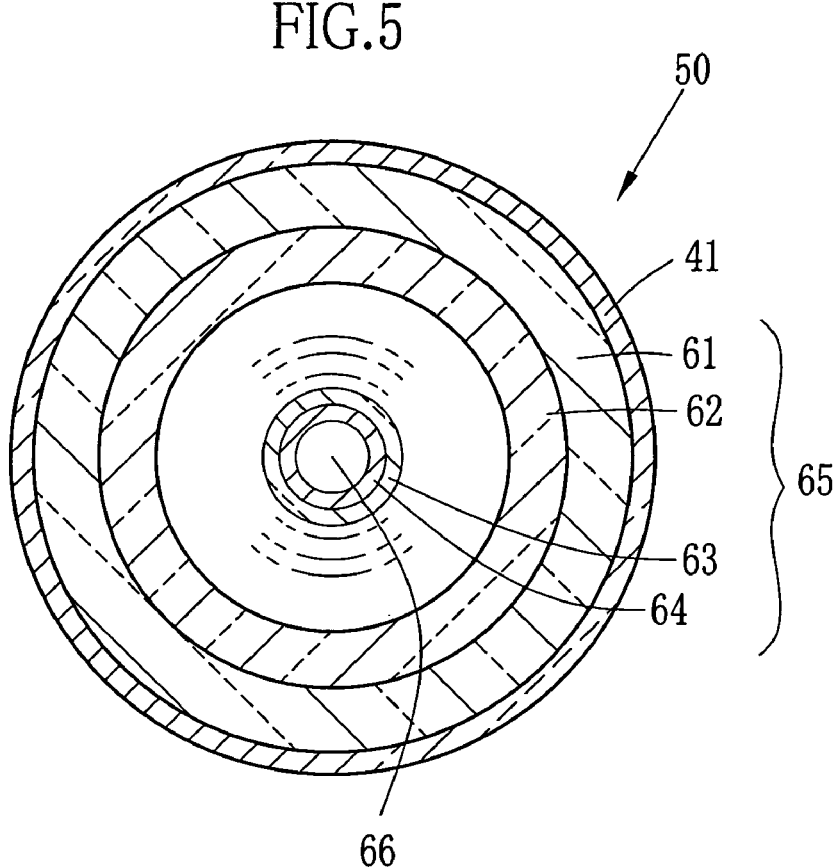
FIG. 5 is a cross-sectional view of a preform formed in the process shown in FIG. 4.

As shown in FIG. 5, the preform 50 comprises a pipe 41 to be the outer shell, and a core 65 having multi-layer structure including the first layer 61 and the second layer 62 to the (n−1)th layer 63 and the nth layer 64. The pipe 41 may be removed after the plural layers is formed inside thereof, in case a clad is formed by the polymerization or another method. In FIG. 5, there is a cavity 66 in the center of the preform 50. However, the existence or nonexistence of the cavity 66 and the ratio of diameter thereof to the outer diameter of the preform 50 are not limited and may be changed in accordance with the manufacturing conditions.

Although the preform 50 in FIG. 5 clearly shows a border between each two of the pipe 41 and the layers 61 to 64 for convenience of the explanation, the border may be identified not clearly, because the clarity of the border is dependent on conditions of the production. For example, polymerizable compositions of the first layer 61 and the second layer 62 may be in contact and soaked through each other, which makes the border invisible.

Figure 6:
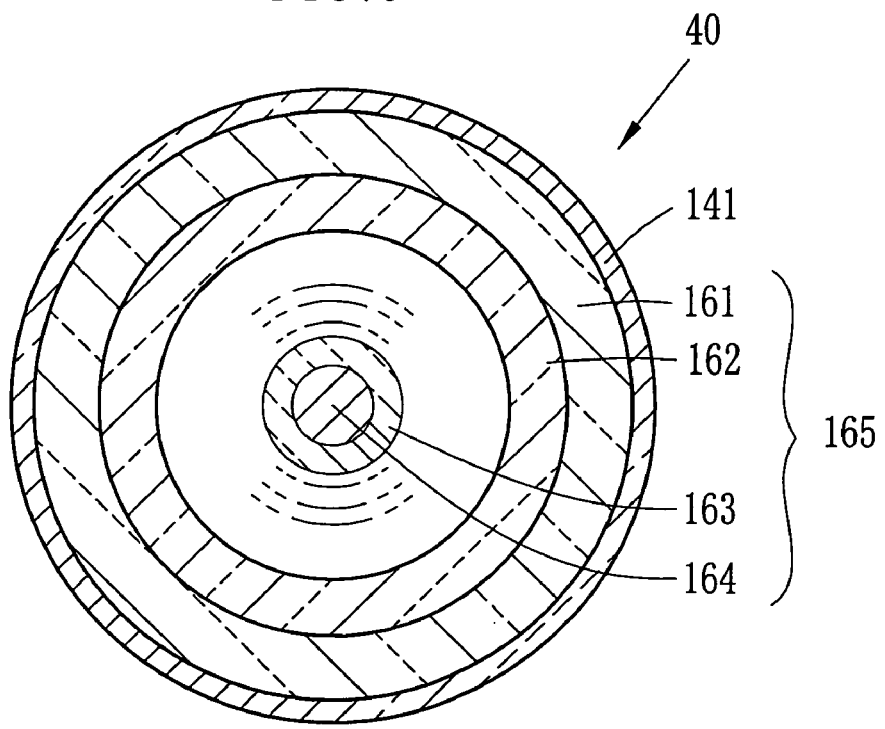
FIG. 6 is a cross-sectional view of the plastic optical fiber obtained from the preform shown in FIG. 5.
Figure 7A:
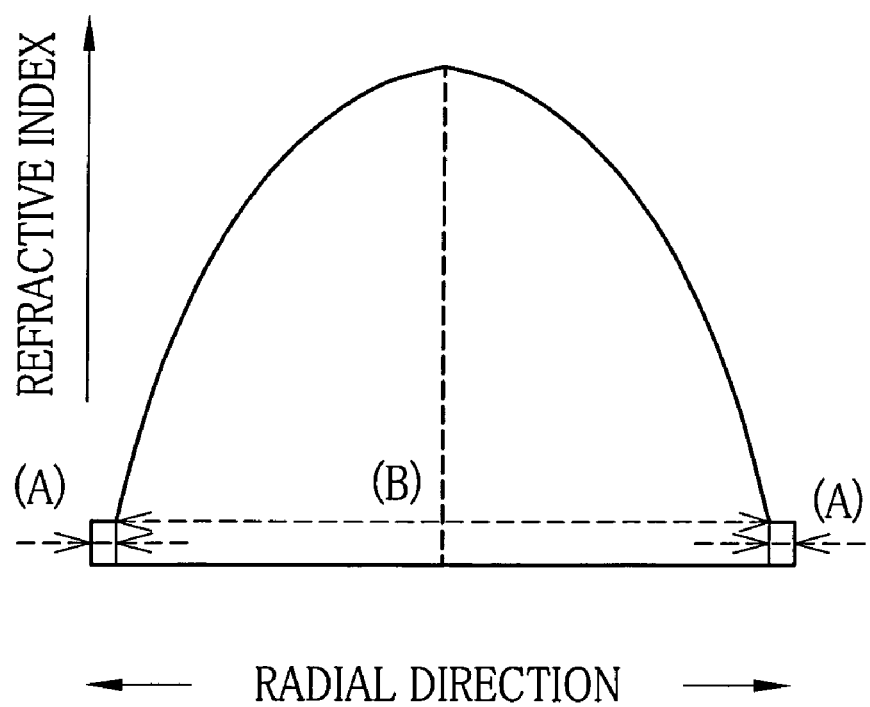
FIG. 7A is an explanatory view describing a refractive index distribution of a greded-index lens from the present invention in radial direction.
Figure 7B:
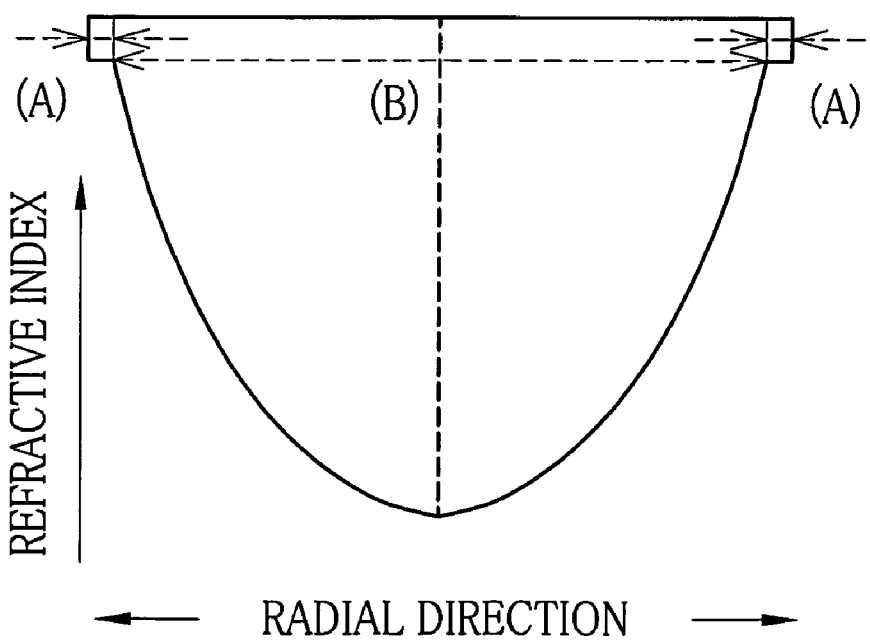
FIG. 7B is an explanatory view describing a refractive index distribution of another greded-index lens from the present invention in radial direction.

Each layer 61 to 64 of the core 65 has a refractive index different to each other. The first layer 61 has lower refractive index than that of the second layer 62, that is, the layer nearer to the center of the core 65 has higher refractive index than that of the layer farther from the center of the core 65. In addition, the difference of the refractive indices between the adjacent two layers (for example between the first layer 61 and the second layer 62, or between the (n−1)th layer 63 and the nth layer 64) is adjusted to at least $5\times10^{-5}$ but less than $5\times10^{-3}$. Since the difference between the refractive indices of the adjacent two layers is adjusted as described above, the preform 50, in which conformity of the interfaces is improved, can be obtained. Since the preform 50 is heat-drawn to be a thin linear shape, the POF 40 shown in FIG. 6, which has superior transparency and transmission band property, can be produced. The POF 40 is described later in detail. When the preform 50 is heat-drawn to have a desired diameter with removing the cavity and is cut to be a tabular shape, a graded-index (GRIN) lens shown in FIGS. 7A and 7B, having a specific refractive index distribution from the center to the outside in the radial direction thereof, can be produced. In FIG. 7A and FIG. 7B, the horizontal axis indicates the distance from the center of the POF 40 in the radius direction, and the vertical axis indicates the refractive index. The refractive index increases as the line in the graph goes upward. The range (A) corresponds to the pipe 141, and the range (B) corresponds to the first to nth layers 161 to 164.

To form the refractive index distribution in the core 65, at least two kinds of polymerizable contents having different refractive indices are copolymerized at a different compounding ratio for each layer 61 to 64 of the core 65. In this embodiment, deuteriated 2,2,2-trifluoromethyl methacrylate (3FMd7) whose polymer has a refractive index of 1.41, and deuteriated pentafluorophenyl methacrylate (PFPMAd5) whose polymer has a refractive index of 1.49 are used as the two of polymerizable contents. Although the refractive index decreases toward the outside in the radial direction of the preform 50 of this embodiment, the refractive index may change both in a stepwise manner or a continuous manner. In this embodiment, 3FMd7 and PFPMAd5 in which a part of hydrogen atoms is substituted by deuterium atoms are used for forming each layer. The use of the deuteriated polymer for the light transmission section is preferable to reduce the transmission loss.

Note that the pipe 41 may be formed from polymerizable composition or monomer having lower refractive index than that for forming the first layer 61. Instead, the pipe 41 may be formed such that the refractive index thereof approximately equals to that of the first layer 61.

Materials for forming the core 65 will be explained. The polymerizable contents used for forming each layer 61 to 64 are preferably able to form polymers which are amorphous to prevent light scattering and has excellent fitness to each other, excellent mechanical properties, moisture resistance and heat-resistance.

For example, the polymerizable contents used for forming the first to nth layers are (meth)acrylic acid esters [(a) (meth) acrylic ester without fluorine, (b) (meta)acrylic ester containing fluorine], (c) styrenic compounds, (d) vinyl esters, (e) monomer for forming chain cyclic fluorine-containing polymer, amorphous fluorine resin (for example, Teflon AF(registered trademark)), AVA resin, norbornene-based resin (for example, ZEONEX (registered trademark: produced by ZEON corporation)), functional norbornene-based resin (for example, ARTON (registered trademark: produced by JSR)), bisphenol-A being raw material of polycarbonates, and so forth. To select the porymerizable contents for each layer, the relations of the refractive index, affinity and so on between them for adjacent layers are preferably considered.

Concretely, examples of the (a) (meth)acrylic acid ester without fluorine are methyl methacrylate; ethyl methacrylate; isopropyl methacrylate; tert-butyl methacrylate; benzyl methacrylate; phenyl methacrylate; cyclohexyl methacrylate, diphenylmethyl methacrylate; adamanthyl methacrylate; isobornyl methacrylate; norbornyl methacrylate; methyl acrylate; ethyl acrylate; tert-butyl acrylate; phenyl acrylate, and the like.

Examples of (b) (meth)acrylic ester with fluorine are 2,2, 2-trifluoroethyl methacrylate; 2,2,3,3-tetrafluoro propyl methacrylate; 2,2,3,3,3-pentafluoro propyl methacrylate; 1-trifluoromethyl-2,2,2-trifluoroethyl methacrylate; 2,2,3,3, 4,4,5,5-octafluoropenthyl methacrylate; 2,2,3,3,4,4,-hexafluorobutyl methacrylate, and the like.

Further, in (c) styrene type compounds, there are styrene; α-methylstyrene; chlorostyrene; bromostyrene and the like. In (d) vinylesters, there are vinylacetate; vinylbenzoate; vinylphenylacetate; vinylchloroacetate; and the like. In (e) monomer for forming main chain cyclic fluorine-containing polymer, there are monomer for forming polymer which forms fluorine-containing polymer having cyclic structure as a monomer or having cyclic structure on amorphous chain by cyclic polymerization; monomer for forming polymer having aliphatic ring or heterocyclic ring on the main chain such as polyperfluorobutanylvinyl ether (known as CYTOP(registered trademark)) and such as described in Japanese Patent Laid-Open Publication No. 8-334634; monomer described in Japanese Patent Application No. 2004-186199; and the like. Although the present invention is not limited to the above kinds of the polymerizable contents, it is preferable that the kinds and relative proportions of the polymerizable compositions are selected such that the copolymer from the polymerizable compositions has a desired refractive index distribution in the light transmission medium formed therefrom.

As to the preferred polymerizable contents for each layer, besides the above-mentioned various compounds, there is copolymer of methylmethacrylate (MMA) and fluoro(meth) acrylate, for example. As fluoro(meth)acrylate, there are trifluoroethyl methacrylate (3FM), hexafluoro isopropyl methacrylate and so forth, for example. Moreover, there is copolymer of MMA and alicyclic (meth)acrylate. As alicyclic (meth)acrylate, there are (meth)acrylate having branch structure such as tert-butyl methacrylate, isobornyl methacrylate, norbornyl methacrylate, tricyclodecanyl methacrylate and so forth. Further, it is possible to use polycarbonate (PC), norbornene-based resin (for example, ZEONEX (registered trademark: produced by ZEON corporation)), functional norbornene-based resin (for example, ARTON (registered trademark: produced by JSR)), fluororesin (for example, polytetrafluoroethylene (PTFE), polyvinylidene fluoride (PVDF) and so forth). Furthermore, it is possible to use copolymer of fluorine resin (for example, PVDF-based copolymer), tetrafluoroethylene, perfluoro alkylvinyl ether (PFA) random copolymer, chlorotrifluoroethylene (CTFE) copolymer, and so forth.

In order to use the POF 40 for the near-infrared rays, polymers such as described in Japanese Patent No. 3332922 and Japanese Patent Laid-Open Publication No. 2003-192708 are utilized. In this polymer, deuterium atom, fluorine and so forth are substituted for the hydrogen atom of a C—H bond, since absorption loss is caused by the C—H bond. By using this kind of the polymer, the wavelength region causing the transmission loss is shifted to the longer-wavelength side, and it is possible to reduce the loss of the transmission signal light. With respect to this kind of the polymer, for instance, there are deuteriated polymethylmethacrylate (PMMA-d8), polytrifluoroethylmethacrylate (P3FMA), and polyhexafluoro isopropyl-2-fluoroacrylate (HFIP2-FA). Incidentally, it is desirable that the impurities and foreign materials in the raw compound that causes dispersion should be sufficiently removed before polymerization so as to keep the transparency of the POF after polymerization.

For polymerizing the polymerizable composition to produce a copolymer, polymerization initiators are used. As to the polymerization initiators, there are various kinds to generate radicals. For example, there are benzoil peroxide (BPO); and peroxide compound [such as tert-butylperoxy-2-ethylhexanate (PBO); di-tert-butylperoxide (PBD); tert-butylperoxyisopropylcarbonate (PBI); n-butyl-4,4-bis(tert-butylperoxy)valarate (PHV), and the like]. Other examples of the polymerization initiators are azo compounds, such as 2,2'-azobisisobutylonitril; 2,2'-azobis (2-methylbutylonitril); 1,1'-azobis(cyclohexane-1-carbonitryl); 2,2'-azobis(2-methylpropane); 2,2'-azobis(2-methylbutane) 2,2'-azobis(2-methylpentane); 2,2'-azobis(2,3-dimethylbutane); 2,2'-azobis(2-methylhexane); 2,2'-azobis(2,4-dimethylpentane); 2,2'-azobis (2,3,3-trimethylbutane); 2,2'-azobis(2,4,4-trimethylpentane); 3,3'-azobis(3-methylpentane); 3,3'-azobis (3-methylhexane); 3,3'-azobis(3,4-dimethylpentane); 3,3'-azobis(3-ethylpentane); dimethyl-2,2'-azobis(2-methylpropionate); diethyl-2,2'-azobis(2-methylpropionate); di-tert-butyl-2,2'-azobis(2-methylpropionate), and the like. Note that the polymerization initiators are not limited to the above substances. More than one kind of the polymerization initiators may be combined.

In order to keep the physical properties, such as mechanical properties, thermal properties and so forth of the copolymer, over the whole plastic optical fiber to be manufactured, it is preferable to control the polymerization degree by use of the chain transfer agent. The kind and the amount of the chain transfer agent are selected in accordance with the kinds of the polymerizable monomer. The chain transfer coefficient of the chain transfer agent to the respective monomer is described, for example, in "Polymer Handbook, $3^{rd}$ edition", (edited by J. BRANDRUP & E. H. IMMERGUT, issued from JOHN WILEY & SON). In addition, the chain transfer coefficient may be calculated through the experiments in the method described in "Experiment Method of Polymers" (edited by Takayuki Ohtsu and Masayoshi Kinoshita, issued from Kagakudojin, 1972).

Preferable examples of the chain transfer agent are alkylmercaptans [for instance, n-butylmercaptan; n-pentylmercaptan; n-octylmercaptan; n-laurylmercaptan; tert-dodecylmercaptan, and the like], and thiophenols [for example, thiophenol; m-bromothiophenol; p-bromothiophenol; m-toluenethiol; p-toluenethiol, and the like]. It is especially preferable to use n-octylmercaptan, n-laurylmercaptan, and tert-dodecylmercaptan in the alkylmercaptans. Further, the hydrogen atom on C—H bond may be substituted by the fluorine atom (F) or a deuterium atom (D) in the chain transfer agent. Note that the chain transfer agents are not limited to the above substances. More than one kind of the chain transfer agents may be combined.

With respect to adding quantity of the polymerization initiator and the chain transfer agent, it is possible to properly determine a preferable range in accordance with the kind and so forth of the polymerizable composition to be used for the first to nth layers. In this embodiment, the polymerization initiator is added so as to be 0.005 to 0.050 mass % relative to the polymerizable composition to be used for the first to nth layers. It is much preferable to set this additive ratio within a range of 0.010 to 0.020 mass %. Meanwhile, the chain transfer agent is added so as to be 0.10 to 0.40 mass % relative to the polymerizable composition to be used for the first to nth layers. It is much preferable to set this additive ratio within a range of 0.15 to 0.30 mass %.

Other additives may be contained in each of the layers 61 to 64 so far as the transmittance properties do not decrease. For example, the additives may be used for increasing resistance of climate and durability.

Further, induced emissive functional compounds may be added for amplifying the optical signal. When such compounds are added to the monomer, attenuated signal light is amplified by excitation light so that the transmission distance increases. Therefore, the optical member with such additive may be used as an optical fiber amplifier in an optical transmission link. These additives may be contained in the layers 61 to 64 or a part thereof by polymerizing the additives with the various polymerizable compositions being as the raw material.

In this embodiment, to increase the refractive index toward the center in the radial direction in continuous manner, the layers 61 to 64 are formed by rotation gel polymerization method as described later. In addition, as the polymerizable contents for the first to nth layer, 3FMd7 and PFPMAd5 are used.

Next, the POF 40 made by melt-drawing the preform 50 will be described. As shown in FIG. 6, the POF 40 comprises the first layer 161 and the second layer 162 to the (n−1)th layer 163 and the nth layer 164. The cavity 66 is disappeared since the preform 50 is heat-drawn in the longitudinal direction to be the POF 40.

The refractive index of the POF 40 increases toward the center in the radial direction as same as the preform 50. Accordingly, the first layer 161 has the lowest refractive index and the refractive index continuously increases in the order of the second layer 162 to the (n−1)th layer 163 and the nth layer 164. The refractive index distribution coefficient of the POF 40 is approximately same to that of the preform 50.

Figure 8:
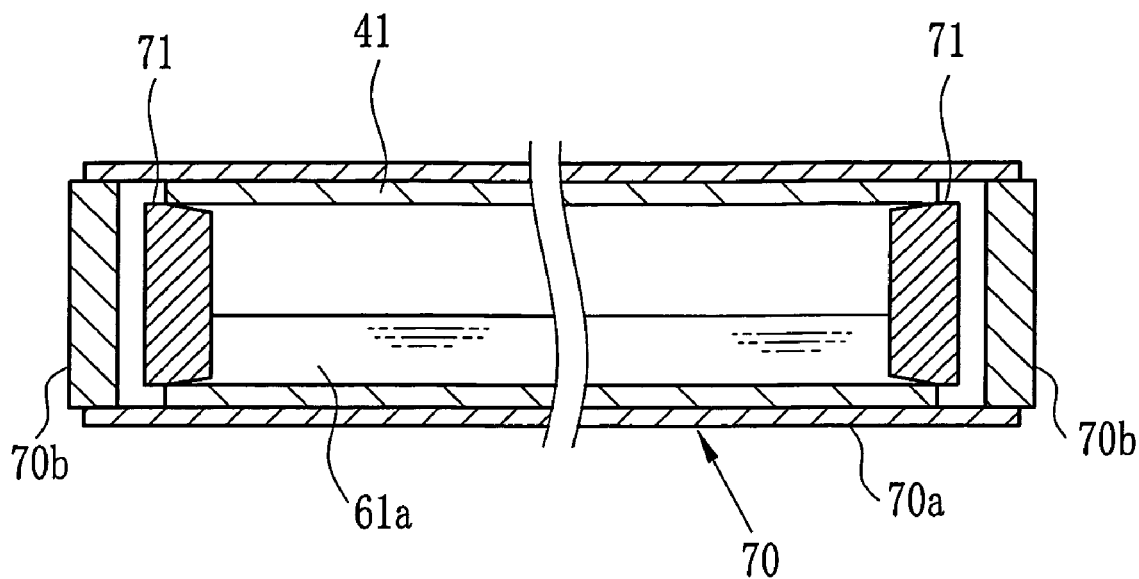
FIG. 8 is a cross-sectional view showing an outline of a polymerization container for rotation polymerization.
Figure 9:
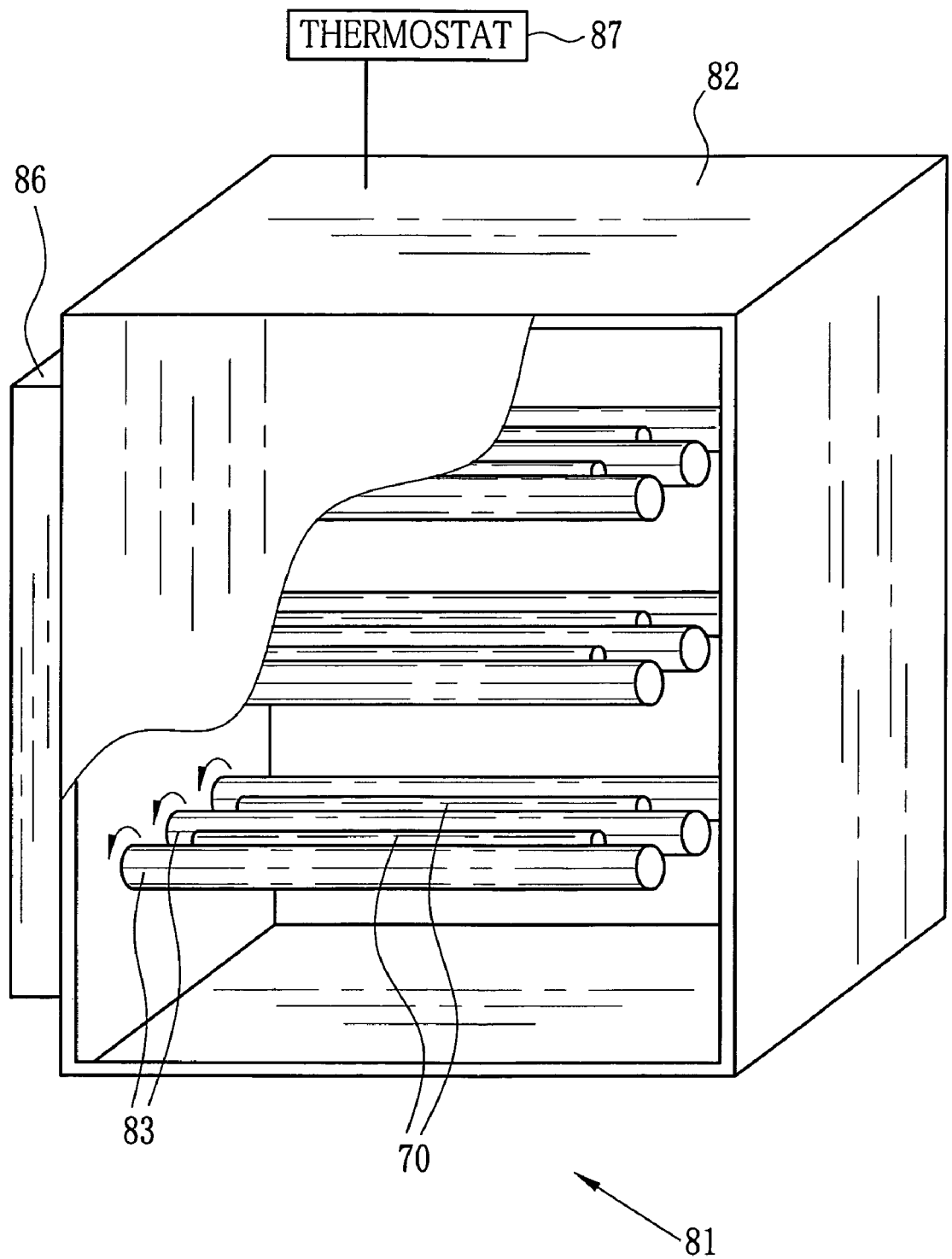
FIG. 9 is a perspective view of an outline of a rotation polymerization apparatus.

The forming method of the preform 50 is described with reference to FIGS. 8 to 10. A polymerization device and a polymerization container shown in FIGS. 8 to 10 do not limit the scope of the present invention, and the embodiment is an example of the present invention. As shown in FIG. 8, a polymerization container 70 comprises a cylindrical container body 70a and a pair of lids 70b for sealing both ends of the container body 70a. The container body 70a and the lids 70b are made of SUS. The inner diameter of the polymerization container 70 is slightly larger than the outer diameter of the pipe 41 contained therein, and the rotation of the pipe 41 is synchronized with the rotation of the polymerization container 70.

At first, the pipe 41 formed by the commercial type melt-extrusion machine or the like is contained in the polymerization container 70. One end of the pipe 41 is sealed with a plug 71 formed from a material that is not dissolved by the polymerizable contents for the first to nth layers. An example of the material of the plug 61 is polytetrafluoroethylene (PTFE) The plug 71 does not contain the compound that flows out a plasticizer.

After sealing the end of the pipe 41, a first polymerizable composition 61a for the first layer 61 is poured in the hollow portion of the pipe 41. The other end of the pipe is sealed with the plug 71, and then the first layer 61 is formed by polymerization of the first polymerizable composition 61a while rotation of the polymerization container 70. In order to ensure to rotate the pipe 41 together with the polymerization container 70, a support member or the like maybe provided in the inner wall of the polymerization container 70.

For rotating the polymerization container 70 as described above, a rotation polymerization device 71 is used. As shown in FIG. 9, the rotation polymerization device 71 comprises plural rotation members 83, a driver section 86 and a thermostat 87. The rotation members 83 are in a housing 82, and the driver section 86 and the thermostat 87 are provided outside of the housing 82. The thermostat 87 measures the temperature in the housing 82, and controls this temperature based on the measured result.

The cylindrical rotation members 83 are arranged in parallel such that the polymerization container 70 is supported by adjacent two rotation members 83. One end of the rotation member 83 is rotatably supported by the inner wall of the housing 82, and independently driven by the driver section

86. The driver section 86 has a controller (not illustrated) for controlling the operation of the driver section 86.

Figure 10:
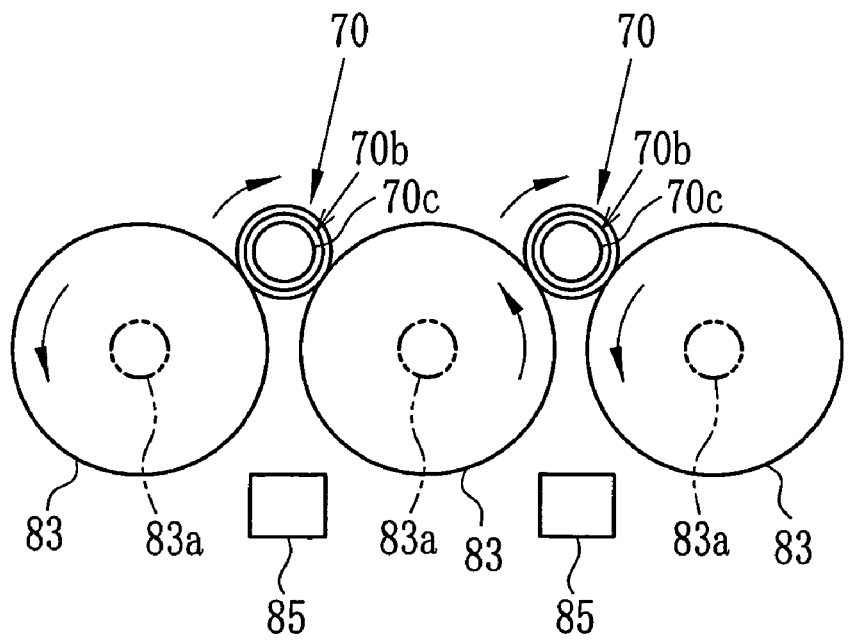
FIG. 10 is an explanatory view describing the rotation of the polymerization chamber in the rotation polymerization apparatus.

In the polymerization, the polymerization container 70 is held in the space between the surfaces of the adjacent rotation members 83, and rotated in accordance with the rotation of the rotation members 83 around the rotational axis 73a, as shown in FIG. 10. Since the polymerization container 70 is set and rotated in the rotation polymerization device 81, the first polymerizable composition 61a is polymerized. The method to rotate the polymerization container 70 is not limited to the surface drive type described in this embodiment.

As shown in FIG. 10, the polymerization container 70 is kept from moving upward during the rotation because of a magnet 70c provided in the lid 70b and a magnet 85 provided below the adjacent rotation members 83. In addition, upper rotation members may be provided above the polymerization container 70, and the upper rotation members may be rotated together with the rotation members 83 to prevent the polymerization container 70 from moving upward. It is also possible to provide holding means above the polymerization container 70 to apply certain weight to the polymerization container 70, but the method to hold the polymerization container 70 does not limit the scope of the present invention.

Before the rotation polymerization, the first layer material may be subject to preliminary polymerization in which the pipe 41 is kept substantially vertically. In the preliminary polymerization, a rotation mechanism may be provided to rotate the pipe 41 around the cylinder axis, if necessary. The rotation polymerization can form the first layer 61 on the whole inner surface of the pipe 41 because the longitudinal axis of the pipe 41 is kept horizontal. In forming the first layer 61, although it is preferable that the longitudinal axis of the pipe 41 is kept horizontal in order to form the first layer 61 on the whole inner surface of the pipe 41, the longitudinal axis of the pipe 41 may be kept roughly horizontal. The permissive angle of the vertical axis of the pipe 41 is about 5° to the ground.

The first to nth polymerizable compositions are preferably used after removing inhibitor, moisture, impurities and so forth, by filtering and distillation. In addition, it is preferable that the mixture of the monomer and the polymerization initiator is subject to ultrasonic wave process to remove dissolved gas and volatile component. The pipe 41 and the first polymerizable composition may be subject to decompression process by use of a known decompression apparatus just before or/and after forming the first layer 61, if necessary.

The pipe 41 having the first layer 61 is taken out of the rotation polymerization device 81, and then the pipe 41 is subject to heating process by use of a heating machine such as the thermostatic oven at a predetermined temperature.

Figure 11:
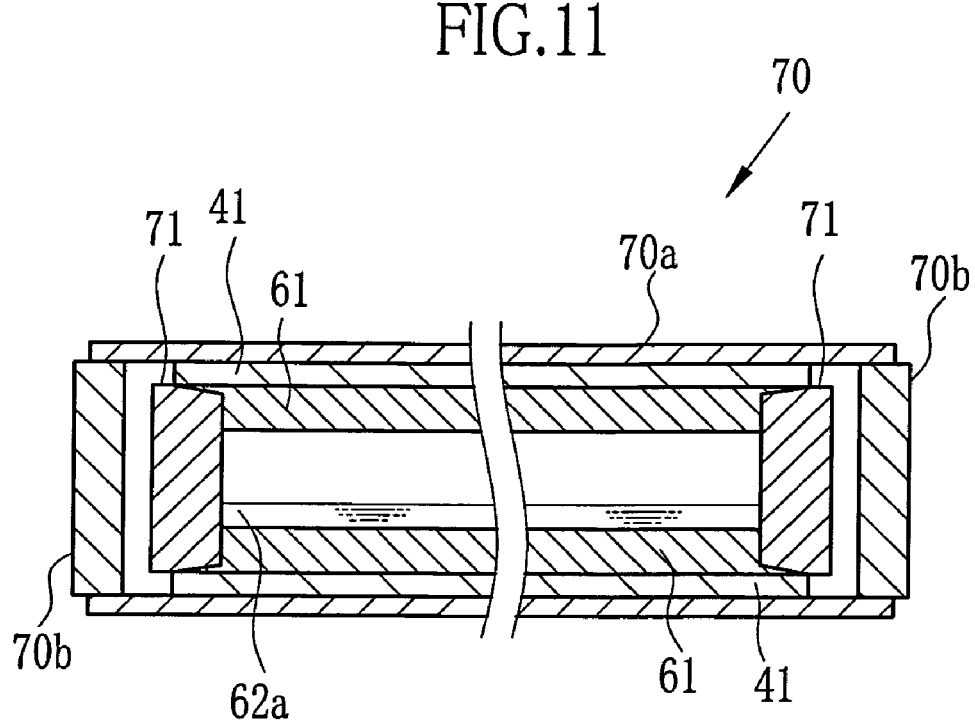
FIG. 11 is a perspective view of an outline of the rotation polymerization apparatus after formation of the first layer.

The second to nth layers 62 to 64 are formed sequentially By polymerization. Referring to FIG. 11 showing the polymerization container 70 used in formation of the first layer 61, the second polymerizable composition 62a is poured in the hollow part of the first layer 61. Then the pipe 41 is set in the polymerization container 70 with both edges thereof being sealed by the plugs 71, such that the longitudinal axis of the pipe 41 is kept horizontal. While the pipe 41 is rotated around the cylinder axis thereof, the second polymerizable composition is polymerized to form the second layer 62. Polymerization of the second to nth polymerizable compositions is carried out by use of the rotation polymerization device 81 (see FIG. 9) used for formation of the first layer 61. The pipe 41 and the second to nth polymerizable compositions may be subject to decompression process by use of a known decompression device just before or/and after pouring the second to nth polymerizable compositions, if necessary.

When the second polymerizable composition 62a starts polymerization, the second polymerizable composition 62a swells the inner wall of the first layer 61 to generate a gelled swelling layer in an initial stage of polymerization. Such swelled layer accelerates the polymerization of the second layer 62 (gel effect). In this embodiment, polymerizable composition poured into the pipe 41 is reacted to the revolving pipe 41 to form a swelled layer, so the polymerizable composition is polymerized. Such process for polymerization is referred to as the rotational gel polymerization process.

It is preferable to control the reaction speed. For example, the reaction speed is preferable adjusted such that the conversion rate for an hour is 5-90%, more preferably 10-85%, and most preferably 20-80%. The reaction speed is controlled by adjusting the kind of the polymerization initiator, the polymerization temperature, and so forth. Note that any well-known method to measure the conversion rate may be applicable. For example, an experiment is carried out in advance to obtain the relationship between the visual evaluation and the quantitative evaluation of the residual polymerizable contents by use of a gas chromatography, therefore the conversion rate of the polymerizable composition can be found from the obtained relationship only by visual evaluation. The reaction temperature in the rotational gel polymerization is preferably equal to or smaller than the boiling points of the polymerizable contents to be used. The rotational speed is preferably adjusted to control the conversion rate or other properties of the layers 61 to 64.

According to the above-described method, the preform 50 having the multi-layer structure formed inside the pipe 41 can be produced. And by melt-drawing the preform 50 in the drawing process 51, the POF 40 having the desired diameter (for example 200 μm to 1000 μm) can be obtained. In the drawing process 51, the method described in Japanese Patent Laid-open Publication No. 07-234322 or the like may be used.

The POF 40 is normally covered by covering material as stated above so as to form at least one protective layer thereon, for the purpose of improving flexural and weather resistance, preventing decrease in property by moisture absorption, improving tensile strength, providing resistance to stamping, proving resistance to flame, protecting from damage by chemical agents, noise prevention from external light, increasing the value by coloring, and the like.

The POF 40 is subject to the covering process 52 as the first covering process to manufacture the POF code 53, and single or plural POF codes 53 are subject to the second covering process to manufacture the POF cable. In the event of the optical cable having single optical fiber, it is possible not to carry out the second covering process and to utilize the optical cable with the outermost layer covered by the first covering process. As for the type of covering, there are a contact type covering in which the covering layer contacts the whole surface of the POF code, and a loose type covering in which a gap is provided between the covering layer and the POF code. When the covering layer of the loose type is peeled for attaching a connector, it is possible that the moisture enters the gap between the POF code and the covering layer and extends in the longitudinal direction of the POF cable. Thus, the contact type covering is preferable.

The loose type covering, however, has the advantage in Relaxing the damages caused by stress and heat to the optical fiber cable due to the gap between the covering layer and the POF code. Since the damage to the POF code decreases, the loose type covering is preferably applied to some purposes. It is possible to shield moisture from entering from the lateral edge of the POF cable by filling gelled or powdered material in the gap. If the gelled or powdered material as the filler is provided with the function of improving heat-resistance and mechanical strength, the covering layer with excellent properties can be realized. The loose type covering layer can be formed by adjusting the position of the extrusion nipple of the cross head die, and by controlling the pressure with a decompression device. The thickness of the gap layer between the POF code and the covering layer can be controlled by adjusting the thickness of the nipple and pressure to the gap layer. The covering layer formed on the POF in the first and second covering processes may contain the additives such as flame retardant, ultraviolet absorber, antioxidant, shading agent and lubricant as long as the optical properties of the POF are not affected.

The flame retardants are resin with halogen like bromine, an additive and a material with phosphorus. Metal hydroxide such as aluminum hydroxide or magnesium hydroxide is preferably used as the flame retardant for the purpose of reducing toxic gas emission. The metal hydroxide contains water of crystallization, which is not removed during the manufacture of the POF. Thus the metal hydroxide as the flame retardant is preferably added to the outermost covering layer of the optical cable, not to the covering layer that is directly contacted to the POF 40.

The POF cable 55 may be covered with plural covering layers with multiple functions. Examples of such covering layers are a flame retardant layer described above, a barrier layer to prevent moisture absorption in the POF 40, moisture absorbent to remove the moisture in the POF 40 (for example moisture absorption tape or gel, between the protective layers or in the protective layer).

In addition, as other functional layers, there are a flexible material layer and a styrene forming layer as shock absorbers to relax stress in bending the POF, a reinforced layer to increase rigidity. The thermoplastic resin as the covering layer may contain structural materials to increase the strength of the POF cable. The structural materials are a tensile strength fiber with high elasticity and/or a metal wire with high rigidity. These materials are preferable in terms of improving the mechanical strength of the manufactured POF cable 55.

Examples of the tensile strength fibers are an aramid fiber, a polyester fiber, a polyamid fiber. Examples of the metal wires are stainless wire, a zinc alloy wire, a copper wire. The structural materials are not limited to those listed above. It is also possible to provide other materials such as a metal pipe for protection of the POF cable 55, a support wire to hold the POF cable 55. A mechanism to increase working efficiency in wiring is also applicable to the POF cable 55.

In accordance with the way of use, the POF cable 55 is selectively used as a cable assembly in which the POF codes 53 are circularly arranged, a tape core wire in which the POF codes 53 are linearly aligned, an assembly in which the tape core wires are bundled by using a band or LAP sheath, or the like.

Compared with the conventional optical fiber cable, the POF cable 55 according to the present invention has large permissible error in the core position, and the POF cables 55 may be connected directly. But it is preferable to ensure to fix the end of the POF cable as the optical member according to the present invention by using an optical connector. The optical connectors widely available on the market are PN type, SMA type, SMI type and the like. Therefore, the POF cable 55 of the present invention can be applied to a system to transmit optical signals, which uses optical signal processing devices including optical components, such as a light emitting element, a light receiving element, an optical switch, an optical isolator, an optical integrated circuit, an optical transmitter and receiver module, and the like. Such system may be combined with other optical fibers. Any known techniques can be applied to such system. The techniques are described in, for example, "'Basic and Practice of Plastic Optical Fiber' (issued from NTS Inc.)", "'Optical members can be Loaded on Printed Wiring Assembly, at Last' in Nikkei Electronics, vol. Dec. 3, 2001", pp. 110-127", and so on.

By combining the optical member according to with the techniques in these publications, the POF cable 55 is applicable to short-distance optical transmission system that is suitable for high-speed and large capacity data communication and for control under no influence of electromagnetic wave. Concretely, the optical member is applicable to wiring in apparatuses (such as computers and several digital apparatuses), wiring in trains and vessels, optical linking between an optical terminal and a digital device and between digital devices, indoor optical LAN in houses, collective housings, factories, offices, hospitals, schools, and outdoor optical LAN.

Further, other techniques to be combined with the optical transmission system are disclosed, for example, in "'High-Uniformity Star Coupler Using Diffused Light Transmission' in IEICE TRANS. ELECTRON., VOL. E84-C, No. 3, MARCH 2001, pp. 339-344", "'Interconnection in Technique of Optical Sheet Bath' in Journal of Japan Institute of Electronics Packaging., Vol. 3, No. 6, 2000, pp. 476-480". Moreover, there are an arrangement of light emitting elements on a waveguide surface (disclosed in Japanese Patent Laid-Open Publication No.2003-152284), an optical bus (disclosed in Japanese Patent Laid-Open Publications No.10-123350, No.2002-90571, No.2001-290055 and the like); an optical branching/coupling device (disclosed in Japanese Patent Laid-Open Publications No.2001-74971, No.2000-329962, No.2001-74966, No.2001-74968, No.2001-318263, No.2001-311840 and the like); an optical star coupler (disclosed in Japanese Patent Laid-Open Publications No.2000-241655); an optical signal transmission device and an optical data bus system (disclosed in Japanese Patent Laid-Open Publications No.2002-62457, No.2002-101044, No.2001-305395 and the like); a processing device of optical signal (disclosed in Japanese Patent Laid-Open Publications No.2002-23011 and the like); a cross connect system for optical signals (disclosed in Japanese Patent Laid-Open Publications No.2001-86537 and the like); a light transmitting system (disclosed in Japanese Patent Laid-Open Publications No.2002-26815 and the like); multi-function system (disclosed in Japanese Patent Laid-Open Publications No.2001-339554, No.2001-339555 and the like); and various kinds of optical waveguides, optical branching, optical couplers, optical multiplexers, optical demultiplexers and the like. When the optical system having the optical member according to the present invention is combined with these techniques, it is possible to construct an advanced optical transmission system to send/receive multiplexed optical signals. The optical member according to the present invention is also applicable to other purposes, such as for lighting, energy transmission, illumination, lenses and sensors. As the lenses, there are both a convex lens whose refractive index increases toward the center in the radial direction and a concave lens whose refractive index decreases toward the center.

The present invention will be described in detail with reference to Experiments (1)-(3). The description below explains Experiment (1) in detail. Regarding Experiments (2)-(3), the portions different from Experiment (1) will be explained. Note that the scope of the present invention is not limited to these Experiments.

[Experiment (1)]

By the melt-extrusion molding, the pipe 41 of PVDF having the inner diameter of 20 mm and the length of 27 cm was formed. The first polymerizable composition 61a was poured into the hollow portion of the pipe 41, through a PTFE membrane-filter having 0.2 μm pore diameter. To prepare the first polymerizable composition 61a, 3FMd7 (hereinafter the content A) of 21.73 ml and PFPMAd5 (hereinafter the content B) of 4.56 ml were mixed as the polymerizable composition, and then dimethyl 2,2'-azobis(isobutyrate) of 0.1 mol % of sum of the content A and the content B and dodecyl mercaptan of 0.05 mol % of sum of the content A and the content B were added into the polymerizable composition.

The pipe 41 containing the first polymerizable composition 61a was set in the container body 70a in the rotation polymerization device 81 with the longitudinal direction of the pipe 41 being horizontal. The polymerization container 70 of SUS was rotated for 2 hours at 2000 rpm in 90° C. atmosphere to perform heat-polymerization. An isolated thermocouple was provided near the rotating polymerization container 70 (for example, 1 cm to 2 cm distance from the polymerization container 70) to measure the temperature of the polymerization container 70, and the measured temperature was considered as a temperature of heat by the polymerization reaction. The measured peak of the temperature (heat) was 67° C. at the time after a lapse of an hour and 20 minutes from the start of polymerization. Accordingly, the first layer 61 was formed inside the pipe 41. An conversion rate of the obtained polymer was 90%.

Next, the pipe 41 with the first layer 61 was drawn out from the polymerization container 70, and the second polymerizable composition 62a was poured into the hollow portion of the pipe 41. Then the second layer 62 was formed by rotation polymerization. The polymerization condition and procedure were the same as in forming the first layer 61. To prepare the first polymerizable composition 61a, the content A of 7.57 ml and the content B of 1.99 ml were mixed as the polymerizable composition, and then dimethyl 2,2'-azobis(isobutyrate) of 0.1 mol% of sum of the content A and the content B and dodecyl mercaptan of 0.05 mol % of sum of the content A and the content B were added into the polymerizable composition. After forming the second layer 62, the third to eleventh polymerizable composition were prepared according to respective compounding ratio A/B and pouring amount A+B shown in Table 1, and the polymerization processes as same as above were applied to form 11 layers inside the pipe 41.

After polymerizing the eleventh polymerizable composition, the pipe 41 was heated at 90° C. for 6 hours to cause the reaction of residual polymerizable contents. Then the pipe 41 was removed to obtain the preform 50. The preform 50 was melt-drawn at 200° C. with decompression in the cavity 66. Accordingly, the cavity 66 was closed and the POF 40 was obtained. The outer diameter of the POF 40 was 470 μm, and variation of the diameter was ±15 μm.

Figure 12:
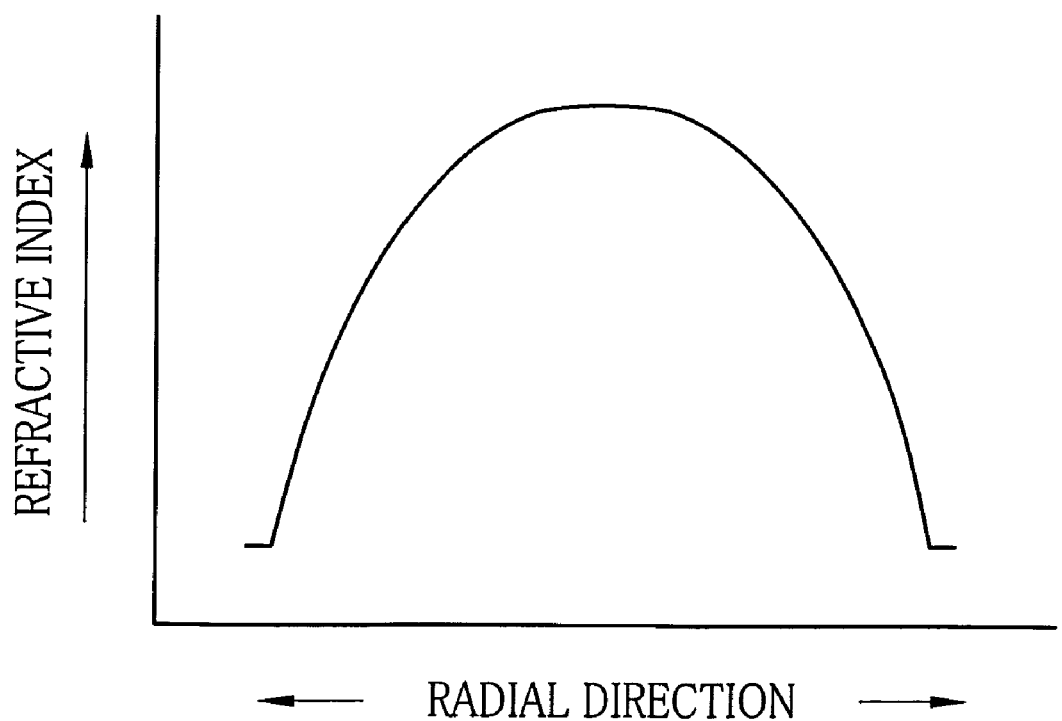
FIG. 12 is an explanatory view describing a refractive index distribution of a plastic optical fiber obtained by Experiment (1) in radial direction.

By measuring the refractive index distribution of the POF 40 with use of a transmitted dual-beam interference microscope (TD-20, Mizojiri Optical Co., Ltd.), the refractive index distribution graph shown in FIG. 12 was obtained. The measured refractive index distribution coefficient g was 2.2. Further, the measured transmission loss value in the POF 40 was 126 dB/km at 650 nm of light source, 91 dB/km at 780 nm, and 106 dB/km at 850 nm. In addition, the transmission band of the POF 40 was 10GHz·50 m at 850 nm.

[Experiment (2)]

The mixed monomers shown under "Experiment (2)" in Table 1 were used to produce the preform 50 in the manufacturing conditions and procedures same to Experiment (1). Then the preform 50 was melt-drawn to be the POF 40. The measured refractive index distribution coefficient g was 2.2, and the variation of the outer diameter of the POF 40 was ±15μm. Further, the measured transmission loss value in the POF 40 was 140 dB/km at 650 nm of light source, 109 dB/km at 780 nm, and 126 dB/km at 850 nm. In addition, the transmission band of the POF 40 was 8 GHz·50m at 850 nm.

[Experiment (3)]

The mixed monomers shown under "Experiment (3)" in Table 1 were used to produce the preform 50 in the manufacturing conditions and procedures same to Experiment (1). In the preform 50, white turbidity was visually confirmed in the first to third layers. The POF 40 was formed by melt-drawing the preform 50 at 200° C., as same as Experiments (1) and (2). The drawing magnification was adjusted such that an outer diameter of region where the refractive index distribution was formed became 220 μm. When attempting to measure the refractive index distribution of the POF 40, it was not able to be measured because detection of interference pattern was disturbed by the white turbidity. The variation of the outer diameter of the POF 40 was ±15 μm. Further, the measured transmission loss value in the POF 40 was 700 dB/km at 650 nm of light source, 200 dB/km at 780 nm, and 230 dB/km at 850 nm. In addition, the transmission band of the POF 40 was 6 GHz·50 m at 850 nm.

The compounding ratio of each monomer prepared in each experiment is shown in Table 1. In addition, in each preform 50 formed in each experiment, refractive indices of the polymers formed from the first to eleventh monomers were measured at 589 nm of light source, and each difference between refractive indices of each adjacent two layers was calculated. The refractive indices and their difference were shown in Table 2.

TABLE 1

| | | Ex. 1 | | | | Ex. 2 | | | | Ex. 3 | | | |
| --- | --- | --- | --- | --- | --- | --- | --- | --- | --- | --- | --- | --- | --- |
| P | O | A (ml) | B (ml) | A/B | A + B | A (ml) | B (ml) | A/B | A + B | A (ml) | B (ml) | A/B | A + B |
| 1st | 1 | 21.7 | 4.6 | 4.8 | 26.3 | 21.7 | 4.6 | 4.8 | 26.3 | 21.7 | 4.6 | 4.8 | 26.3 |
| 2nd | 2 | 7.6 | 2.0 | 3.8 | 9.6 | 7.4 | 2.2 | 3.4 | 9.6 | 7.1 | 2.4 | 3.0 | 9.5 |
| 3rd | 3 | 6.7 | 2.1 | 3.2 | 8.7 | 6.3 | 2.4 | 2.6 | 8.7 | 5.9 | 2.8 | 2.1 | 8.7 |
| 4th | 4 | 5.8 | 2.1 | 2.8 | 7.9 | 5.4 | 2.5 | 2.1 | 7.9 | 4.8 | 3.0 | 1.6 | 7.9 |
| 5th | 5 | 5.0 | 2.1 | 2.4 | 7.1 | 4.5 | 2.5 | 1.8 | 7.1 | 3.9 | 3.1 | 1.3 | 7.0 |
| 6th | 6 | 4.3 | 2.0 | 2.2 | 6.3 | 3.8 | 2.4 | 1.6 | 6.3 | 3.1 | 3.1 | 1.0 | 6.2 |
| 7th | 7 | 3.7 | 1.8 | 2.1 | 5.5 | 3.2 | 2.3 | 1.4 | 5.5 | 2.5 | 2.9 | 0.9 | 5.4 |
| 8th | 8 | 3.1 | 1.6 | 1.9 | 4.7 | 2.6 | 2.0 | 1.3 | 4.7 | 2.0 | 2.6 | 0.8 | 4.6 |
| 9th | 9 | 2.5 | 1.4 | 1.8 | 3.9 | 2.1 | 1.8 | 1.2 | 3.9 | 1.6 | 2.3 | 0.7 | 3.8 |

TABLE 1-continued

|  |  | Ex. 1 | | | | Ex. 2 | | | | Ex. 3 | | | |
|---|---|---|---|---|---|---|---|---|---|---|---|---|---|
| P | O | A (ml) | B (ml) | A/B | A + B | A (ml) | B (ml) | A/B | A + B | A (ml) | B (ml) | A/B | A + B |
| 10th | 10 | 2.0 | 1.1 | 1.8 | 3.1 | 1.7 | 1.4 | 1.2 | 3.1 | 1.2 | 1.8 | 0.7 | 3.0 |
| 11th | 11 | 1.5 | 0.8 | 1.8 | 2.3 | 1.2 | 1.1 | 1.1 | 2.3 | 0.9 | 1.4 | 0.6 | 2.3 |

P: polymerizable composition
O: pouring order

TABLE 2

|  | Ex. 1 | | Ex. 2 | | Ex. 3 | |
|---|---|---|---|---|---|---|
| L | Rv | Dra ($\times 10^{-3}$) | Rv | Dra ($\times 10^{-3}$) | Rv | Dra ($\times 10^{-3}$) |
| 1st | 1.432 | 2.7 | 1.432 | 4.2 | 1.432 | 6.2 |
| 2nd | 1.435 | 2.5 | 1.437 | 3.8 | 1.439 | 5.4 |
| 3rd | 1.438 | 2.1 | 1.440 | 3.4 | 1.444 | 5.0 |
| 4th | 1.440 | 1.9 | 1.444 | 2.9 | 1.449 | 4.1 |
| 5th | 1.442 | 1.6 | 1.447 | 2.4 | 1.453 | 3.6 |
| 6th | 1.443 | 1.3 | 1.449 | 2.1 | 1.457 | 2.9 |
| 7th | 1.445 | 1.0 | 1.451 | 1.5 | 1.460 | 2.3 |
| 8th | 1.446 | 0.7 | 1.453 | 1.1 | 1.462 | 1.6 |
| 9th | 1.446 | 0.5 | 1.454 | 0.7 | 1.464 | 1.0 |
| 10th | 1.447 | 0.1 | 1.455 | 0.2 | 1.465 | 0.5 |
| 11th | 1.447 | — | 1.455 | — | 1.465 | — |

L: formed layer
Rv: measured refractive index value
Dra: difference of refractive index between adjacent two layers In the result, Experiments (1) and (2), in which the difference between the refractive indices of each adjacent two layers was adjusted to at least $5 \times 10^{-5}$ but less than $5 \times 10^{-3}$, shows the superior transparency in the layers. However, in Experiment (3), in which the differences between the refractive indices of some adjacent two layers were $5 \times 10^{-3}$ or more, there became the white turbidity in the layers and the transparency thereof was worse. In addition, Experiments (1) and (2) shows transmission band superior to that of Experiment (3). Therefore, it is proved that when forming the plural layers inside the hollow portion of the outer clad to produce the preform, adjusting the difference of the refractive indices between the adjacent two layers to at least $5 \times 10^{-5}$ but less than $5 \times 10^{-3}$ realizes the manufacture of the POF having superior transparency and low transmission loss.

Various changes and modifications are possible in the present invention and may be understood to be within the present invention.

INDUSTRIAL APPLICABILITY

The present invention is preferably applied to a plastic optical medium for optical transmission, lighting, energy transmission, illumination, sensor, concave and convex lenses and so forth.

The invention claimed is:

1. A production method for a plastic optical medium comprising steps of:
    pouring a polymerizable composition in a hollow portion of a pipe;
    polymerizing said polymerizable composition while rotating said pipe, to form a first polymer layer on an inner wall of said pipe; and
    additionally performing a pair of said pouring step and said polymerizing step n−1 times (n is an integer at least two) to stack n-layers including said first polymer layer to a nth polymer layer in a concentric fashion, a difference of refractive indices between adjacent two polymer layers being at least $5 \times 10^{-5}$ but less than $5 \times 10^{-3}$,
    wherein each of said n-layers has a lower refractive index than that of the adjacent polymer layer at the outer side, and has a higher refractive index than that of the adjacent polymer layer at the inner side in the radial direction.

2. A production method for a plastic optical medium described in claim 1, wherein first to nth said polymerizable compositions to generate first to nth said polymer layers include mixture of same plural polymerizable contents, a mixing ratio of said polymerizable contents being changed according to each of said first to nth polymerizable compositions to give a different refractive index to each of said first to nth polymer layers.

3. A production method for a plastic optical medium described in claim 2, wherein said polymer layer at the inner side is formed from said polymerizable composition including larger ratio of said polymerizable content which has a lower refractive index than that of at least another polymerizable content in the same polymerizable composition, compared with said polymerizable composition for forming the adjacent polymer layer at the outer side in the radial direction.

4. A plastic optical medium produced by said production method described in claim 1.

5. A plastic optical medium described in claim 4, wherein said plastic optical medium becomes an optical fiber.

6. A plastic optical medium described in claim 4, wherein said plastic optical medium becomes a graded-index lens.

* * * * *